(12) United States Patent
Voigt et al.

(10) Patent No.: US 8,733,724 B2
(45) Date of Patent: May 27, 2014

(54) ONE-PIECE PLASTIC CLAMPING DEVICE FOR HOLDER FOR BEVERAGE CONTAINERS

(75) Inventors: Torsten Voigt, Cologne (DE); Klaus Schorn, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/391,087

(22) PCT Filed: Sep. 17, 2010

(86) PCT No.: PCT/EP2010/063717
§ 371 (c)(1),
(2), (4) Date: Feb. 17, 2012

(87) PCT Pub. No.: WO2011/033074
PCT Pub. Date: Mar. 24, 2011

(65) Prior Publication Data
US 2012/0153113 A1    Jun. 21, 2012

(30) Foreign Application Priority Data

Sep. 18, 2009   (DE) .......................... 10 2009 029 579
May 10, 2010   (DE) .......................... 10 2010 028 805

(51) Int. Cl.
*A47K 1/08*         (2006.01)
*B60N 3/10*         (2006.01)

(52) U.S. Cl.
CPC ................ *B60N 3/108* (2013.01); *B60N 3/105* (2013.01)
USPC ..................... 248/311.2; 248/316.1; 220/703; 220/737

(58) Field of Classification Search
CPC .......... B60N 3/10; B60N 3/108; B60N 3/101; B60N 3/105; B60N 3/106
USPC ............. 248/311.2, 310, 312.1, 316.1, 316.7; 224/148.1, 282, 281, 679, 926; 220/703, 737, 62.12, 629; 206/427, 206/429, 435
See application file for complete search history.

(56) References Cited

U.S. PATENT DOCUMENTS

| 2,215,411 | A | * | 9/1940 | Sebring ....................... 248/311.2 |
| 4,623,112 | A | * | 11/1986 | Olson ........................... 248/153 |
| 2004/0021048 | A1 | * | 2/2004 | Schaal .......................... 248/310 |
| 2004/0084461 | A1 | * | 5/2004 | Eisenbraun et al. .......... 220/739 |
| 2011/0127308 | A1 | * | 6/2011 | Ogura ............................. 224/545 |
| 2012/0118930 | A1 | * | 5/2012 | Simon et al. ................... 224/545 |

FOREIGN PATENT DOCUMENTS

| DE | 19746472 A1 | 4/1999 |
| DE | 202004000618 U1 | 5/2004 |
| DE | 2004008012 A1 | 4/2005 |
| DE | 19529877 B4 | 11/2006 |

* cited by examiner

*Primary Examiner* — Todd M Epps
(74) *Attorney, Agent, or Firm* — Vichit Chea; MacMillan, Sobanski & Todd, LLC

(57) ABSTRACT

A one-piece clamping device for a cup holder retains beverage containers in an automotive vehicle. The cup holder comprises a container receptacle with a base and an outer casing. The one-piece clamping device comprises retaining jaws which may be radially pushed away and which protrude through the outer casing into the container receptacle. Spring elements, such as spring arms, are arranged integrally on a support element which is further arranged on the base of the container receptacle. The spring elements are configured as a dual-acting flexible arm arrangement.

12 Claims, 4 Drawing Sheets

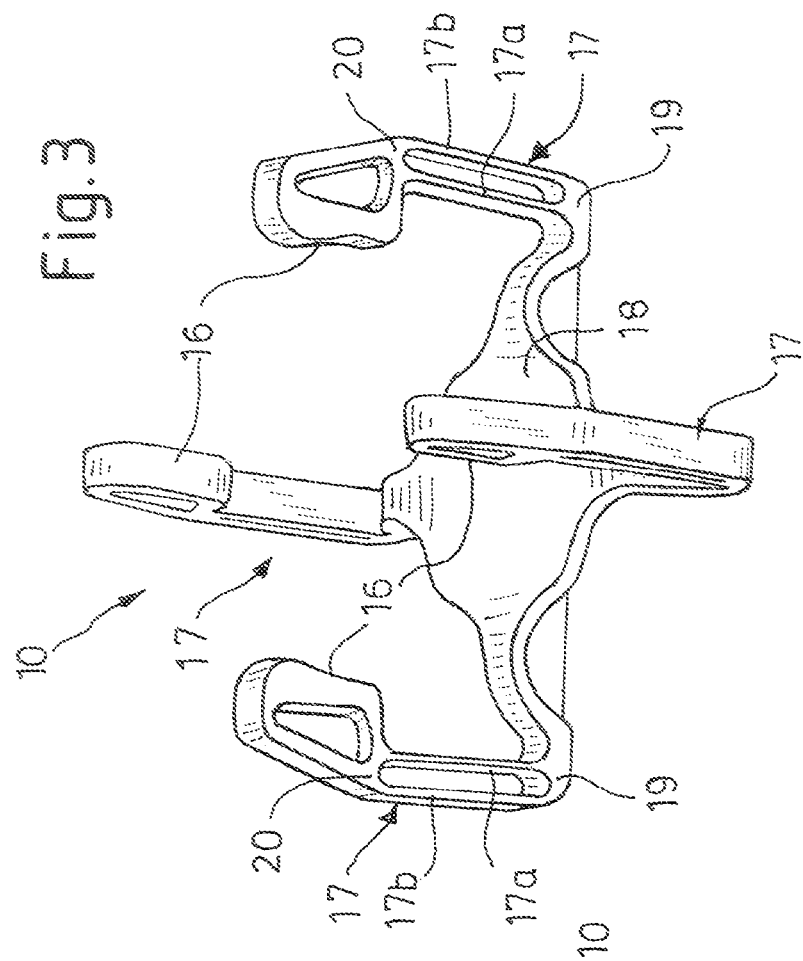
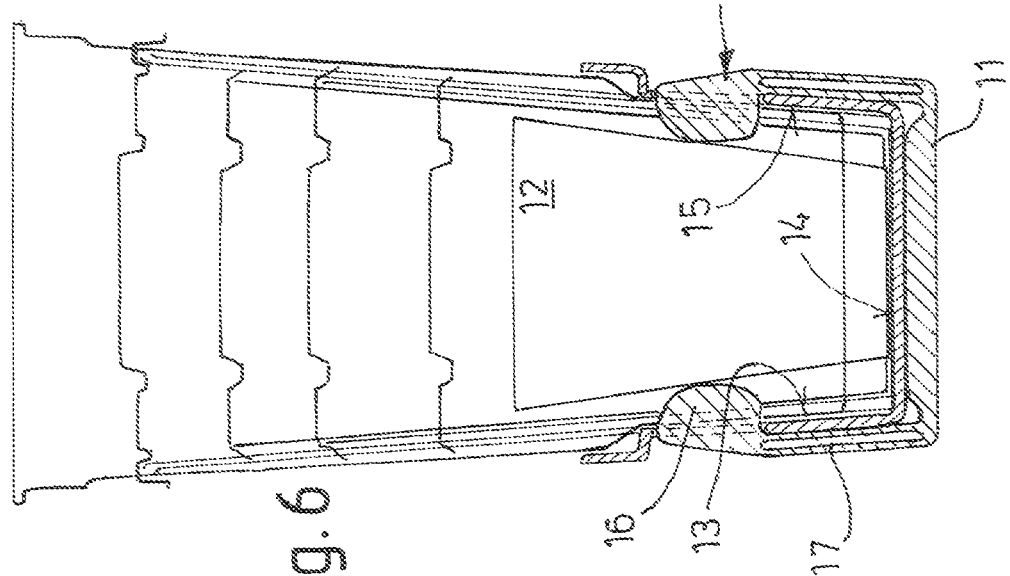

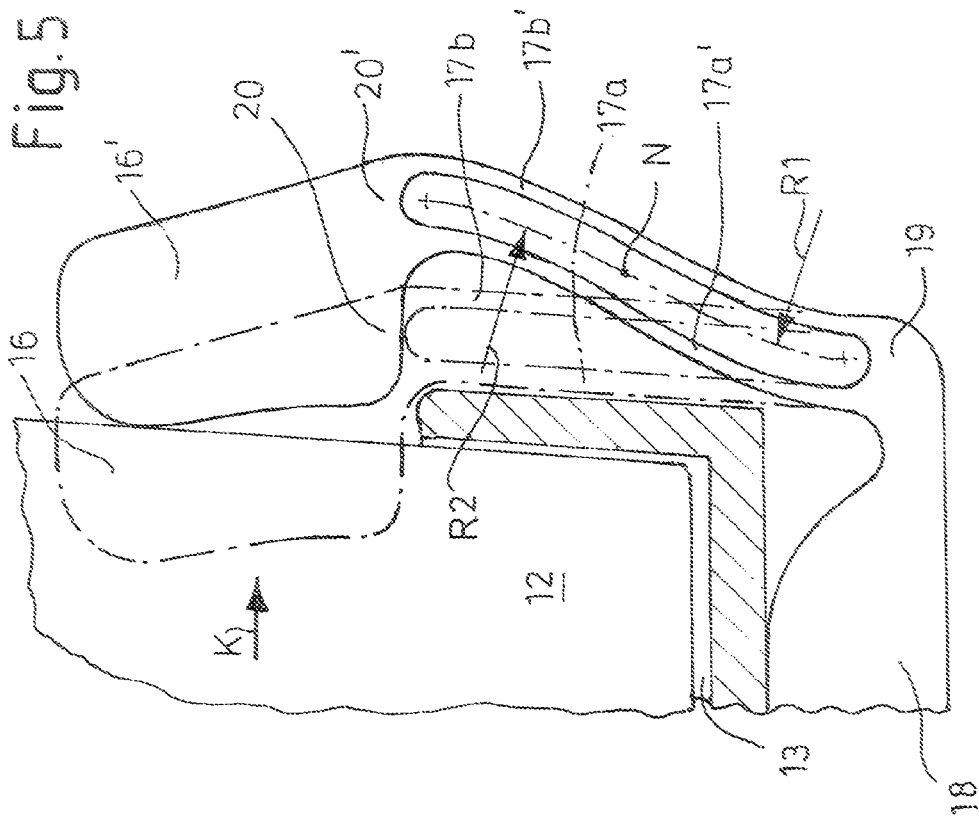
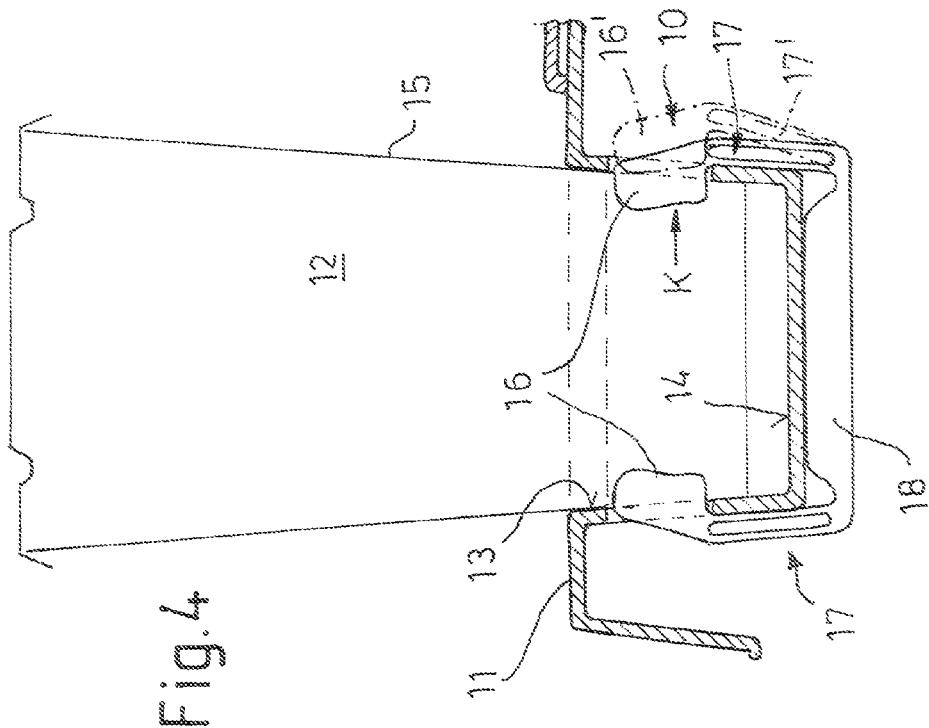

ONE-PIECE PLASTIC CLAMPING DEVICE FOR HOLDER FOR BEVERAGE CONTAINERS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to a clamping device for a cup holder for beverage containers.

In principle, various beverage container sizes on the market require means which have a high capacity for adaptation in order to position the various sizes securely. The base region of typical containers may have a diameter in the range from approximately 50 mm to more than 80 mm, and exhibits various container shapes and angles. Thus, a very flexible clamping device is required for the beverage containers. A difficulty arises whenever the region in which the cup holders are inserted generally provides very little space for the mechanism of the clamping device.

EP 1366952B1 relates to a cup holder with a container receptacle for a beverage container comprising a base and a clamping device with retaining jaws which may be radially pushed away and which protrude into the container receptacle, and which are arranged on spring elements. The spring elements are arranged integrally on a support part which is fastened to the base of the container receptacle. It is provided in this case that the container receptacle on its base comprises an undercut pin to which the support part comprising a keyhole is fastened. According to one embodiment, the retaining jaws are integrally formed on the spring elements. It may be further provided that plastic caps are attached to the retaining jaws.

An arrangement configured in such a manner is intended to provide a cup holder for a beverage container, which may be produced at the lowest possible cost, in particular for the clamping device. For easy fastening it is provided, as disclosed, that the container receptacle on its base comprises an undercut pin to which the support part is fastened by means of a keyhole. During assembly, the support part is slipped over the container receptacle such that the pin is guided through the keyhole. By rotating the support part relative to the container receptacle, the pin engages behind the support part. At the same time, the retaining jaws engage in the openings of the container receptacle, whereby they are prevented from rotating back.

DE 19529877B4 relates to a cup holder for beverage cans, cups, bottles or similar containers in motor vehicles, wherein the cup holder is fastened to internal fittings of the motor vehicle or configured integrally therewith and consists of a cup-like molded part which comprises an integrated space for inserting one of the containers and which is accessible from the top in the installed position. The cup-like molded part comprises regions of reduced inside width, wherein initially a zone of greater inside width adjoins the opening in the direction of the base, to which at least one zone of smaller inside width is adjoined. In this case it is provided that the molded part is surrounded by a clamping device which consists of a central part arranged below the base of the molded part or forming the base of the molded part and resilient arms protruding therefrom, extending along the wall of the molded part and able to be pushed into axially parallel slots of the wall of the molded part, as well as an adjustment member forcing the arms into the slots, by means of which the arms are able to be adjusted from a first position in which they do not protrude beyond the internal contour of the molded part in the slotted region, into a second position in which they protrude radially inward beyond the internal contour of the molded part, and that the arms are stepped inwardly on their flank which protrudes beyond the slots, in a manner which corresponds to the stepped portion of the regions of variable inside width of the molded part, or that by avoiding the adjustment member the resilient arms are able to be moved, by means of a container inserted into the molded part, away from a position in which they protrude radially inward beyond the internal contour of the molded part into a radially outward position counter to the spring force, so that they are supported on the periphery of the inserted container. The arms are stepped on their flank which serves to bear against the container in a manner which corresponds to the stepped portion of the regions of variable inside width of the molded part, so that the edge of the container base bears against the boundary edges of the steps.

In this case, according to one embodiment the arms are integrally formed at the free end of retaining fingers which extend from the central part as far as the opening plane of the molded part, or terminate just before this plane. The arms are oriented from the free ends of the retaining fingers parallel thereto in the direction of the central part, and are arranged between the fingers and molded part or interior of the molded part.

With such a design, a cup holder is intended to be provided which permits the positioning of containers of variable diameters in a manner which is stable and quiet. In this case, the cup-like molded part may have a region of greater inside width, for example in the vicinity of the opening, into which a relatively large cup may be inserted. A region of smaller inside width adjoins the region of greater inside width, into which cans or bottles may be positioned which have smaller diameters than a cup inserted into the first region, but larger diameters than other containers which may alternatively be positioned in the cup holder. Finally, a further zone of even smaller inside width adjoins the zone, into which containers or the like of correspondingly small diameter may be positioned. Thus, depending on the container diameter a corresponding capacity for adjustment in the cup holder is formed, whereby already a marked improvement in the stability and quietness is intended to be achieved. In order to improve the stability and quietness even further, the molded part could be surrounded by the clamping device. In this case, it could be possible by means of the adjustment member to force the resilient arms into the slots of the wall of the cup holder, so that the arms protrude on the inside of the cup holder beyond the wall of the cup holder, and could securely grip the positioned items. As a result, a very high degree of stability and a high level of quietness would be achieved, wherein the appropriate receptacle spaces are able to be provided for containers of variable diameters by means of the stepped portion of the arms corresponding to the stepped portions of the internal diameter of the cup holder.

DE 202004000618U1 relates to a device for receiving in a vehicle receptacle containers which may be filled with liquids, wherein the device comprises a container which is open on one side and which consists of a first plastic material, wherein the container comprises a base and an outer casing. The outer casing comprises elements which may protrude into the interior of the container. The elements consist of a second plastic material which has resilient properties. In this case, a spring element made of plastic material acts on each element protruding into the interior of the container, which exerts a compressive force on the element. It is provided that each spring element comprises a spring arm and a retaining arm, wherein preferably the retaining arms of a plurality of spring elements form a unit.

In such an embodiment, a cup holder for beverage containers is intended to be provided which, on the one hand, is sealed relative to escaping liquids and, on the other hand, may be adjusted for various container sizes. In this case, the inwardly protruding elements and the outer casing consist of different materials, but form a single component. The elements and the outer casing are able to be produced in a single method step in a two-component injection-molding method. Also in this case, the spring element acts via a stud on the outer face of the element, which means that the surface of the element comprises an inwardly facing boss relative to the substantially cylindrical or conical wall. This boss achieves its maximum size when a beverage container is not present in the cup holder. According to the diameter of the beverage container, the spring element is forced outward via the boss through the beverage container, so that the beverage container is able to be pushed in. In addition to the retaining function, the spring element exerts a stabilizing function which has the result that the beverage container is only able to be released again from its cup holder by overcoming a resistance. Thus, beverage containers of which the height exceeds the height of the cup holder are secured against tipping up. By means of the elements made of resilient plastic material and the spring elements acting thereon, therefore, beverage containers of variable diameter could be securely retained. Such a spring element could advantageously consist of plastic material. Spring elements made of metal or rubber and/or flexible component inserts with metal springs would result in rattling noise in cup holders for beverage containers from the prior art, due to the combination of different materials and the joins which remain when assembling more or less costly spring elements to separate retaining elements. Such rattling noise could also occur with substantially more expensive movable spring elements, as a plurality of elements could be used which would have to be displaceably mounted relative to one another in order to fulfill the function of providing a cup holder for beverage containers of variable volume.

A drawback of the foregoing arrangements, in particular, is that the spring mechanisms shown are based on a single flexible bar and only permit a rotation about the clamping point. As a result, a rounded design of the retaining jaws in the lower region is necessary in order to ensure perfect contact. The arrangement shown in DE 202004000618 U1, moreover, for plastic material requires the single flexible bar to be of very long design and namely longer than the beverage container itself, wherein the deflection of the plastic bar in the event of the usual restoring forces may result in stress whitening in this case.

SUMMARY OF THE INVENTION

An object of the present invention is to improve clamping devices whilst maintaining the previous advantages in such a manner that the drawbacks of the solutions previously discussed are avoided. The clamping device is intended, in particular, to be improved with regard to its flexibility and its ability to secure beverage containers of various sizes.

This object and other objects are achieved according to the invention by the spring element being configured as a dual-acting flexible bar arrangement. "Dual-acting flexible bar arrangement" means in this case that a spring element is subjected to a double bend over its length, even when the one end of the spring element (where it is connected to the retaining jaw) is a free end. Over the length of the spring element, therefore, two different directions of curvature result, and the spring element has at least one zero crossing of the curvature, i.e. the bending radius is infinite at that point. Preferably, the zero crossing of the curvature is located approximately between the support element and the retaining jaw. Due to this dual flexible arm arrangement, the retaining jaws are subjected to an almost linear clamping movement.

In addition to the embodiment disclosed below with two or more flexible springs, the dual flexible bar arrangement may also be achieved by other mechanical measures, for instance by the rotation of the retaining jaws during the clamping movement being prevented by a mechanical forced guide element, or by a support of the clamping jaw by a second spring element in a direction opposing the first spring element, wherein the second spring element is also supported on the outer casing or base.

Advantageously, the clamping device comprises at least two flexible springs extending substantially in parallel. Viewed in the clamping direction of the retaining jaws, the flexible springs are arranged one behind the other. As the flexible springs at their respective ends are connected fixedly in terms of rotation to the support element and the retaining jaw, the spring element constitutes a dual-acting flexible bar arrangement. During the clamping movement of one retaining jaw (by the mechanical coupling via the two parallel flexible springs), the retaining jaw is only subjected to a linear displacement and no rotation or only a small rotation; the latter if the flexible springs are not quite arranged in parallel. This linear displacement, however, results in a dual bending of the flexible springs themselves.

This dual flexible arm arrangement of the flexible springs has a high clamping force and a wide clamping range with short spring lengths relative to the previously known solutions. This results from the disclosed dual curvature of the spring element as embodied by the flexible springs. Thus, the level of tension in the flexible springs may be kept low in spite of the high clamping forces obtained. The lower level of tension permits, in turn, lower effective thicknesses of the flexible springs, which in turn permits the level of tension to be reduced and at the same time markedly increases the clamping range. With the use of plastic as material for the flexible springs of the spring element, the flexible springs may be of relatively thin design, and thus are not so rapidly subjected to mechanical overload which otherwise occurs very rapidly when using plastic materials for flexible springs during over-stretching, and which may be identified by whitening (i.e., a whitening on the is overloaded regions of the previously colored plastic material).

In this manner, for the first time the possibility is provided by simple means to achieve a marked improvement in the flexibility and secure cup retention of beverage containers of various sizes. Thus, in comparison with known clamping devices for a cup holder, at most a second flexible spring is required as an additional part for each clamping device.

In a further embodiment, the spring element consists of a plurality of flexible springs arranged substantially in parallel. Instead of the two flexible springs, three or an entire group of flexible springs may also be used as the spring element. Thus, in a small space a very high level of clamping force may be produced with a wide clamping range. It is important here that each flexible spring is respectively only connected fixedly in terms of rotation at its ends to the support element and the retaining jaw. The flexible springs may be connected together between the support element and the retaining jaw but, if possible, these connections should increase the bending stiffness of the spring element itself as little as possible (i.e., the flexible springs should be able to be displaced as far as possible unhindered by the connections relative to one another in the longitudinal direction between the fastening to the support element and the fastening to the retaining jaw). This naturally also applies when using only two flexible springs.

Advantageously, at least one flexible spring is of substantially planar and elongate shape. Thus, a preferred direction for the clamping movement is automatically produced as such a flexible spring is almost exclusively able to be bent about the planar side. A further guide measure is not necessary for the clamping jaw.

In a preferred embodiment, the spring element, the retaining jaw, and the support element are produced in one single piece. Thus, the clamping device is suitable for being produced, in particular, from plastic in an injection-molding process. Thus individual parts, in particular the flexible springs of the spring element, may also be produced from a different material, for example spring steel, around which the material of the support element and/or the retaining jaw is injection-molded. Alternatively, the retaining jaw may be made of a different material and then injection-molded.

Advantageously, the spring element, the retaining jaw, and the support element may be produced from one material, in particular from a suitable plastic material. Then the clamping device is produced integrally with all parts in one operation, again in particular in an injection-molding process. As the flexible springs of the spring element—as mentioned above—may be of relatively thin design, a plastic material which is relatively rigid and not as resilient may also be used for the entire clamping device. As a result of the reduced thickness of the flexible springs, a plastic material may be used as an advantageous material for the entire clamping device.

Preferably, the retaining jaw at least partially comprises a non-slip coating. This coating may be applied retrospectively, it may be injection-molded as an insert with the other parts of the clamping device or applied by any suitable method onto the retaining jaw. The retaining jaw, however, may itself also be completely formed from a non-slip material. The non-slip coating or the non-slip material may be selected so that the retaining jaw achieves optimal retention. The material of the flexible springs and/or the retaining element may be selected according to other requirements.

Preferably, the clamping device is used in a cup holder, in particular for beverage containers, with a container receptacle formed by a base and an outer casing, wherein the support element of the clamping device is arranged on the base and/or on the outer casing and the retaining jaw protrudes into the container receptacle. The cup holder may be used in an automotive interior or other environments.

Advantageously, the support element of the clamping device is fastened to the base and/or to the outer casing. For example, clipping, adhesive bonding, welding, screwing or riveting are suitable as fastening methods. Thus, the clamping device may be constructed separately and optimized with regard to construction and material. The assembly for retaining the cup may be easily implemented via the support element, by the support element being connected to the wall or the base.

In a further embodiment, the support element is an integral part of the base and/or the outer casing and the spring element is fastened to the support element. In this case, the spring element together with the flexible springs and retaining jaws are made separately and then connected to the base and/or the outer casing for completing the cup holder. Preferably, the spring element is fastened in turn to the support element by clipping, adhesive bonding, welding, screwing or riveting.

Advantageously, the clamping device, base, and outer casing are produced in one piece. Thus, the cup holder may be produced in one piece without retrospective mounting.

In a further advantageous embodiment, the clamping device, base, and outer casing are produced from one material. This permits simple recycling of the cup holder, either as rejects during production, when replaced because of damaged, or at the end of the vehicle life.

In the preferred embodiment of the present invention, the spring elements of the clamping device configured as a dual-acting flexible bar arrangement may be clipped onto the cup holder for the beverage containers.

BRIEF DESCRIPTION OF THE DRAWINGS

FIG. 3 is schematic, perspective view of the clamping device according to the invention.

FIG. 4 shows a schematic side view of a beverage container located in the clamping device according to the invention in a cup holder for beverage containers.

FIG. 5 shows an enlarged detail of a clamping device of FIG. 4.

FIG. 6 shows a schematic side view of a plurality of beverage containers is of various sizes located in the clamping device according to the invention in a cup holder for beverage containers.

DETAILED DESCRIPTION OF PREFERRED EMBODIMENTS

Figure 1:
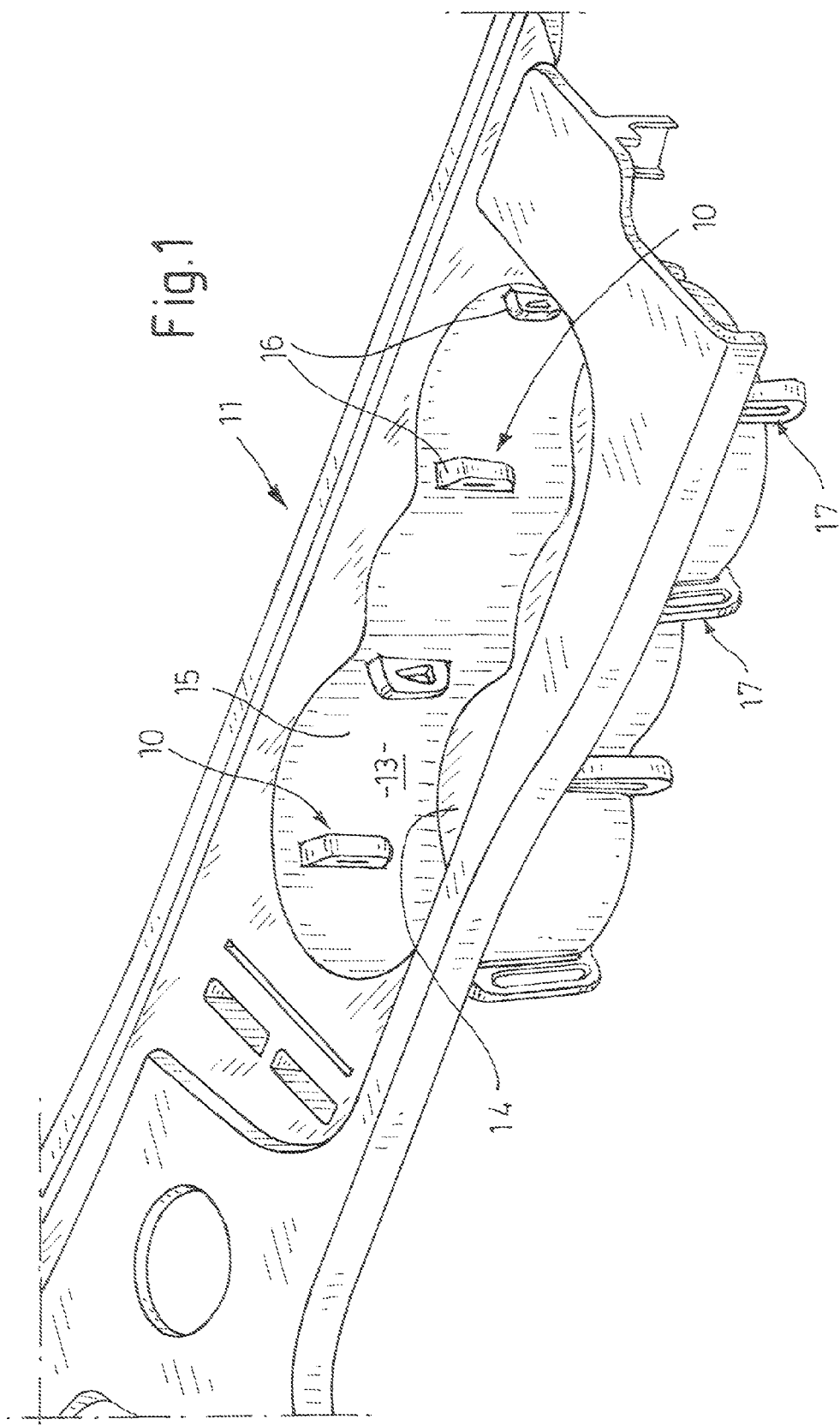
FIG. 1 is a schematic, perspective top view of the clamping device according to the invention in a cup holder for beverage containers.
Figure 2:
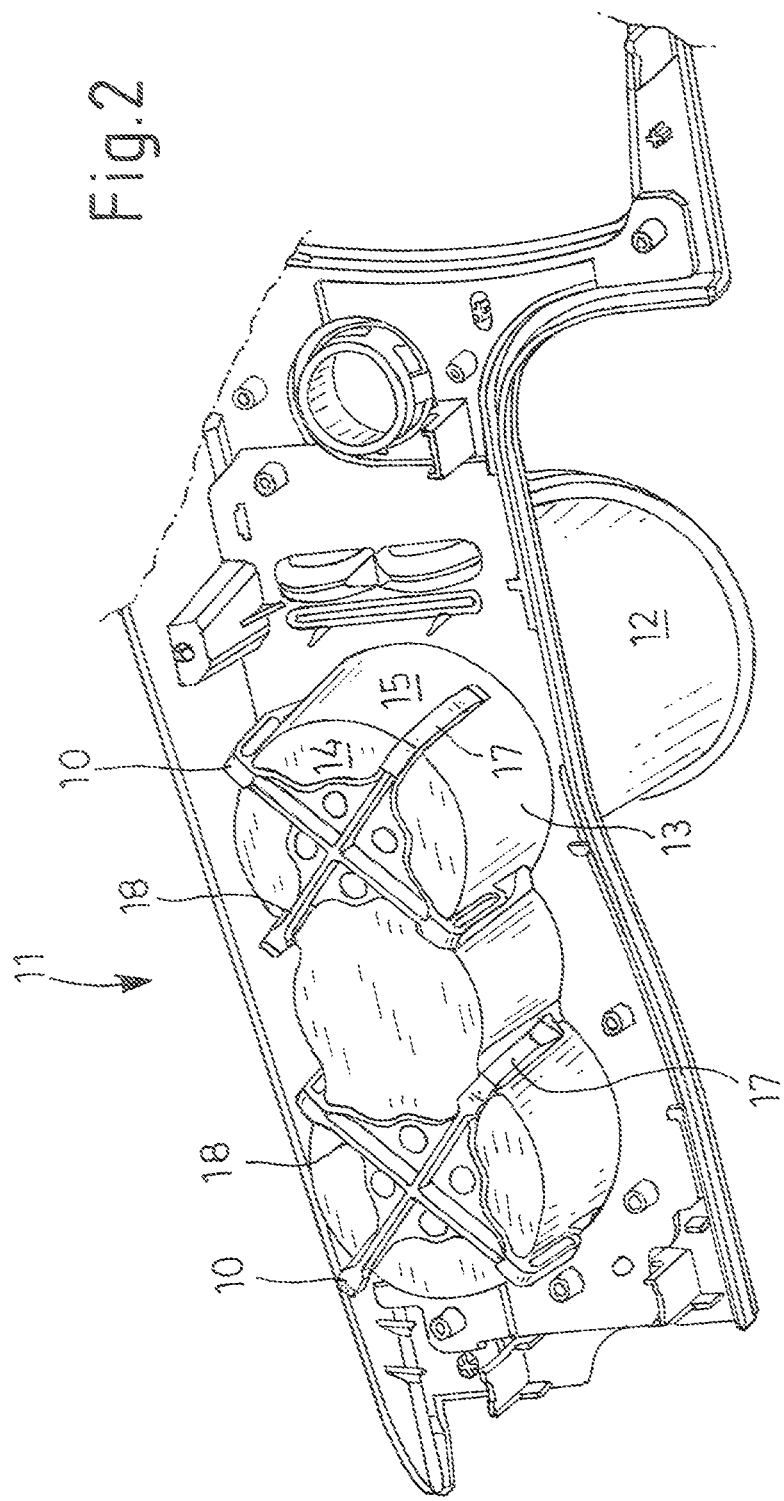
FIG. 2 is a schematic, perspective bottom view of the clamping device according to the invention in the cup holder for beverage containers with the beverage container inserted.

In FIG. 1, a schematic, perspective top view, and, in FIG. 2, a corresponding bottom view are shown of the clamping device 10 according to the invention in a cup holder 11 for beverage containers 12. Cup holder 11 may be a part of a central console of an automobile interior, not described in more detail. Cup holder 11 has a receptacle 13 for receiving one or more beverage containers 12. More particularly, cup holder 11 has a container receptacle 13 for a beverage container 12 comprising a base 14 and an outer casing 15. Clamping device 10 has retaining jaws 16 which are able to be forced radially outwards and which protrude through the outer casing 15 into the container receptacle 13. Retaining jaws 16 are arranged on spring elements 17. Spring elements 17 are arranged integrally on a support element 18 which in turn is arranged on the base 15 of the container receptacle 13.

In this embodiment, it is provided according to the invention that the spring elements 17 are configured as a dual-acting flexible bar arrangement. As also shown in FIG. 3, a spring element 17 comprises the two flexible springs 17a, 17b arranged in parallel and which are arranged one behind the other when viewed in the clamping direction K (FIG. 5). At their ends, flexible springs 17a, b are connected via a torsionally rigid clamping portion 19 to the support element 18 and via a torsionally rigid clamping portion 20 to the retaining jaw 16.

The function of the clamping device 10 is shown in FIG. 4 in a schematic side view, wherein the clamping device is fastened to the base 14 of the cup holder 11. A beverage container 12 is located in the cup holder 11. The retaining jaws 16 are shown in the unclamped position, i.e. undeformed. The retaining jaw 16' is located in the clamped position, in which it is displaced outwardly in the clamping direction K and thus creates a retaining force for the beverage container 12.

The behavior of the flexible springs 17a, 17b is shown in FIG. 5, which shows an enlarged detail of the clamping device 10 of FIG. 4. When positioning the beverage container 12 in the container receptacle 13, the retaining jaw 16 is displaced in the clamping direction K, until the retaining jaw 16' is in the retaining position and securely clamps the cup 12 in the container receptacle 13. During the clamping movement, the retaining jaw 16 is guided outwardly by the two flexible springs 17a, 17b. As the two flexible springs in the clamping portion 19 are mounted fixedly in terms of rotation on the support element 18 and on the clamping portion 20 on the retaining jaw 16, the flexible springs 17a', 17b' in the retaining position have a double bend, characterized by the two opposingly-oriented bending radii R1 and R2. The clamping movement itself extends in an approximately linear manner, as the clamping portion 20' of the clamping jaw 16' is not subjected to rotation or at most is subjected to a small degree of rotation relative to the initial position of the clamping portion 20.

The greatest loading in the flexible springs 17a', 17b' occurs adjacent to the clamping portions 19, 20'. Between the clamping portions 19 and 20', the two flexible springs 17a', 17b' have a zero crossing N of the curvature (i.e., where no bending stress occurs or at most a small degree of bending stress occurs). The bending radii R1, R2 at this point lead toward infinity.

In this manner, for the first time the possibility is provided by simple means to achieve a marked improvement in the flexibility and secure cup retention of beverage containers 12 of different sizes. FIG. 6 illustrates a schematic side view of a plurality of beverage containers 12 of different sizes located in the clamping device 10 according to the invention in a cup holder 11 for beverage containers 12.

As already mentioned, the embodiments shown are only exemplary embodiments of the invention and the invention is not limited thereto. Many alterations and embodiments are possible. Thus the one-piece clamping device 10 according to the invention may have, in particular, a design which is different from the is embodiments shown and/or described.

The cup holder according to the invention may also be used for receiving items which have a similar shape to the beverage containers provided and which are intended to be accommodated in a vehicle in a manner which is secure but always accessible, for example flashlights.

What is claimed is:

1. A clamping device for releasably holding items in a vehicle, comprising:
   a support element;
   a retaining jaw; and
   a spring element configured as a flexible arm arranged between the support element and the retaining jaw, wherein the spring element is a dual-acting flexible arm arrangement to permit a held item to deflect the retaining jaw substantially linearly, wherein the dual-acting flexible arm arrangement comprises at least two flexible spring bars extending substantially in parallel and each connecting with the retaining jaw and support element providing a clamping motion comprised of a double bend with two oppositely oriented bending radii.

2. The clamping device of claim 1 wherein each flexible spring bar is of substantially planar and elongate shape.

3. The clamping device of claim 1 wherein the spring element, the retaining jaw, and the support element are formed as a single piece.

4. The clamping device of claim 1 wherein the spring element, the retaining jaw, and the support element are formed of a single material.

5. The clamping device of claim 1 wherein the retaining jaw at least partially comprises a non-slip coating.

6. The clamping device of claim 1 wherein the retaining jaw comprises a non-slip material.

7. The clamping device of claim 1 wherein the support element has a cross-shaped design and wherein the spring element comprises four spring elements with respective retaining jaws, and wherein each spring element comprises a dual-acting flexible arm arrangement having at least two flexible spring bars extending substantially in parallel and each connecting with the respective retaining jaw and support element to provide a respective clamping motion comprised of a double bend with two oppositely oriented bending radii.

8. A cup holder for beverage containers comprising:
   a container receptacle formed by a base and an outer casing; and
   a clamping device comprising:
      a support element arranged on the base and on the outer casing;
      a retaining jaw protruding into the container receptacle; and
      a spring element configured as a flexible arm arranged between the support element and the retaining jaw, wherein the spring element is a dual-acting flexible arm arrangement to permit a beverage container to deflect the retaining jaw substantially linearly, wherein the dual-acting flexible arm arrangement comprises at least two flexible spring bars extending substantially in parallel and each connecting with the retaining jaw and support element providing a clamping motion comprised of a double bend with two oppositely oriented bending radii.

9. The cup holder of claim 8 wherein the support element of the clamping device is fastened to the base or to the outer casing by clipping, adhesive bonding, welding, screwing, or riveting.

10. The cup holder of claim 8 wherein the support element is integrally formed with the base or the outer casing, and wherein the spring element is fastened to the support element.

11. The cup holder of claim 8 wherein the clamping device, base, and outer casing are formed as a single piece.

12. The cup holder of claim 8 wherein the clamping device, base, and outer casing are formed of a single material.

* * * * *